United States Patent [19]

Rumberger

[11] Patent Number: 5,244,622
[45] Date of Patent: Sep. 14, 1993

[54] CONE CONTROL METHOD FOR FABRICATING COMPOSITE SHAFTS

[75] Inventor: William E. Rumberger, Newtown Square, Pa.

[73] Assignee: The Boeing Company, Seattle, Wash.

[21] Appl. No.: 953,256

[22] Filed: Sep. 30, 1992

Related U.S. Application Data

[63] Continuation of Ser. No. 759,940, Sep. 16, 1991, abandoned, which is a continuation of Ser. No. 155,599, Feb. 12, 1988, abandoned, which is a continuation of Ser. No. 521,763, Aug. 9, 1983, Pat. No. 4,849,152.

[51] Int. Cl.⁵ .............................................. B29C 41/02
[52] U.S. Cl. ..................... 264/319; 156/173; 156/189; 156/194; 264/258; 264/296
[58] Field of Search ............... 264/135, 241, 259, 279, 264/309, 320, 296, 319, 322, 255, 257, 134, 136, 137, 318, 323, 258, 229, 231, 129, DIG. 66; 425/DIG. 218; 156/245, 173, 175, 189, 191, 194, 195; 464/181, 183

[56] References Cited

U.S. PATENT DOCUMENTS

| | | | |
|---|---|---|---|
| 3,700,535 | 10/1972 | McCoy et al. | 156/175 |
| 3,733,233 | 5/1973 | Griffiths | 156/175 |
| 3,850,722 | 11/1974 | Kreft | 156/172 |
| 3,896,206 | 6/1973 | Beaver et al. | 264/258 |
| 3,970,495 | 7/1974 | Ashton et al. | 156/162 |
| 4,236,386 | 5/1979 | Yates et al. | 138/109 |
| 4,238,540 | 12/1980 | Yates et al. | 428/36 |
| 4,256,523 | 3/1981 | Ekstrom | 156/190 |
| 4,289,168 | 9/1981 | Lecourt et al. | 138/109 |
| 4,362,521 | 12/1982 | Puck et al. | 464/181 |

FOREIGN PATENT DOCUMENTS

| | | |
|---|---|---|
| 2080428 | 11/1971 | France . |
| 2152289 | 4/1973 | France . |
| 2531158 | 2/1984 | France . |

*Primary Examiner*—Mary Lynn Theisen
*Attorney, Agent, or Firm*—Jones, Tullar & Cooper

[57] ABSTRACT

A method and tool for fabricating composite shafts with at least one flared end. The tool includes a specially adapted end fitting for each flared end which define the angle and direction of flaring The end fitting includes structure for conforming/compacting the composite material at the flared ends either during and/or after the composite build-up is completed and during cure the conforming/ compacting insures that the external surfaces of the flared ends achieve dimentional control and a machined like quality without the necessity of machining.

4 Claims, 3 Drawing Sheets

CONE CONTROL METHOD FOR FABRICATING COMPOSITE SHAFTS

This is a continuation of co-pending application Ser. No. 07/759,940 filed on Sep. 16, 1991, now abandoned, which is a continuation of Ser. No. 07/155,599, filed Feb. 12, 1988, now abandoned, which is a continuation of Ser. No. 06/521,763, filed Aug. 9, 1983, now U.S. Pat. No. 4,849,152.

CROSS-REFERENCE TO RELATED APPLICATION

This application contains subject matter which relates generally to the subject matter disclosed in co-pending application Ser. Nos. 603,389 and 706,242, both entitled: "COUPLING AND METHOD OF CONNECTING TWO SHAFTS WITH THE COUPLING," now U.S. Pat. Nos. 4,793,040 and 4,838,831.

BACKGROUND OF THE INVENTION

1. Field of the invention

The present invention relates generally to a method of controlling the dimensional and surface characteristics of portions of a mandrel wound composite shaft, and specifically to a method of modifying the fabricating technique of a composite shaft which has at least one flared end, and a tool used in the modified fabrication technique.

The composite shafts are fabricated from continuous filaments in either a roving or tape form within a resin matrix and subsequently cured to form a rigid monolithic structure. The composite shafts fabricated may be used in a static structural application or in a dynamic environment where they may be required to transmit torque and power.

2. Prior Art

Composite shafts and apparatus for fabricating them are known. See, for example, U.S. Pat. No. 3,733,233. In this patent, filament winding is disclosed as the preferred mode of fabrication. Instead of the filament winding, however, a tape winding could be used. To couple the shafts fabricated in accordance with the teaching of the noted patent, the shaft ends must be modified or a coupling provided. An example of such an end modification can be seen in U.S. Pat. No. 4,362,521. In this patent a metal end fitting is provided which is pushed into the shaft end and is engaged by a pair of bolts for torque transmission. The shaft end which accommodates the metal end fitting is provided with a cemented-in sleeve and a cemented-on tubular portion so that the wall thickness of the shaft is not uniform along its length. According to another known end modification technique, an end fitting is wound into the shaft end and as such is locked-in and cannot be removed. Since such designs generally require a thicker wall in the coupler/fastener area their is an associated penalty of cost and weight because extra meterial is required. Also, pin or bolt holes in a composite structure are undesirable because they cut the load carrying filaments and introduce an interlaminar shear condition, i.e., one requiring the resin to transfer load to the next fiber. These coupler/fastener designs are undesirable from a structural standpoint. They are also undesirable because they compromise the simplicity of mandrel winding due to the need to alter the winding schedule in order to properly secure the coupler/fastener, or build-up material in the coupler portion of the shaft.

It would be desirable, therefore, to fabricate a composite shaft which has a generally uniform wall thickness along its length, which does not require a permanently secured coupler/fastener, which does not require that its ends have holes formed therein, and which does not compromise the simplicity of, for example, a filament winding techinque. Also, it would be desirable to fabricate a composite shaft which does not require any substantial amount of machining and eliminates inner and outer machining at its ends.

OBJECTS AND SUMMARY OF THE INVENTION

One object of the present invention is to provide the existing state-of-the-art with a method of fabricating a composite shaft which does not require permanently secured end fittings.

Another object of the present invention is to provide the existing state-of-the-art with a method of fabricating a composite shaft with at least one flared end so that surface machining is not necessary.

A related object of the present invention is to provide the existing state-of-the-art with a tool for use in fabricating a composite shaft with better control of form and surface at at least one end.

Another object of the present invention is to provide the existing state-of-the-art with a method of fabricating a composite shaft where at least one end has uniform concentric, tapered and tooled inner and outer surfaces.

A related object of the present invention is to provide the existing state-of-the-art with a tool for fabricating a composite shaft where at least one end has uniform concentric, tapered and tooled inner and outer surfaces imparted by the tool.

Another object of the present invention is to provide the existing state-of-the-art with a method and tool as previously stated wherein the shaft after curing and parting off the mandrel is in a condition of completeness such that the shaft can be assembled without the necessity of any further substantial machining.

Another object of the present invention is to provide the existing state-of-the-art with a method according to which at least one shaft end has a shock/fretting resistant property.

The present invention, like that disclosed in the noted co-pending application, departs from the existing state-of-the-art by the provision of a flared end feature. The present invention takes the invention disclosed in the noted co-pending application one step further in that both the method and tool produce a shaft with at least one flared end the inner and outer external circumferential surfaces of which are of machine like quality. This quality is achieved without machining and the associated cutting of fibers which is detrimental to the structural integrity of the shaft produced.

The tool includes, in its essential parts, a mandrel and a specially adapted end fitting or end fittings, depending on whether one or both ends of the shaft are to be flared. The end fittings define the angle and direction of flaring. They also give the tool its conforming/compacting capability.

An elastomeric coating is contemplated in conjunction with the end fittings. The elastomeric coating when applied, is applied to at least one of the inner and outer surfaces of each flared end of the shaft. The elastomeric coating provides a fretting/resistant/resilient property to the coupler interface such that the coupler loads are transmitted through the elastomeric.

The method utilizes the conforming/compacting capability to produce a machine-like surface at the inner and outer surfaces of each flared end of the shaft. According to the method, conforming/compacting can proceed intermediately, i.e., at selected intervals in the winding schedule, or after winding is completed. The intermediate option produces a more optimized result. In conjunction with conforming/compacting, the method contemplates producing an optimized fiber placement and a controlled resin density in the flared ends of the shaft.

BRIEF DESCRIPTION OF THE DRAWINGS

Seven figures have been selected to illustrate the preferred embodiment and best mode of the present invention. These figures, while schematic in some respects, are sufficiently detailed to inform those skilled in the art. Included are.

DETAILED DESCRIPTION OF A PREFERRED EMBODIMENT

At least one end of the composite shaft fabricated in accordance with the method and the tool of the present invention is provided with a flared end having substantially parallel inner and outer surfaces which serve as bearing surfaces which are engaged by corresponding surfaces of a coupling. The conformity of the bearing surfaces is of importance. Any surface which is manufactured by, for example, the winding of fibers on a mandrel produces irregularities, which appear as peaks and valleys. A given total bearing load will necessarily be supported upon the peaks thereby greatly increasing the local unit pressure developed. It is essential, therefore, to produce a smooth and regular bearing surface in order to properly distribute the bearing loads.

Although an acceptable outer bearing surface can be achieved through a procedure of winding layers of sacrificial fibers and resin which after curing would be machined to the desired surface shape and finish, such a procedure imposes the penalties of added weight and cost, as well as manufacturing time and risk because of the potential for human error.

To achieve the desired machine-like surface, i.e., a surface which is smooth and conformable to a desired shape at the flared ends of the composite shaft, it is proposed according to the present invention to employ a means for molding fiber adjustment, hereafter referred to as conforming/compacting. For this purpose a pair of cone rings are provided at each flared end of the shaft which act as molds imparting their surface condition to the inner and outer end surfaces of the shaft with which they is engaged. The cone rings can be applied at the end of the winding of the composite shaft, or in addition, at intermediate stages of the winding. In either case, care must be exercised to insure that the compacting force applied to the cone rings is not excessive or deficient. If the force is excessive, a resin starved structure can result, and if the force is dificient, an irregular and resin rich surface structure can result. Neither condition is desirable. The cone control process of the present invention is ideally suited to provide the proper degree of force application, either, or preferrably, in conjunction with the known debulking procedures.

According to one such procedure bleed cloth and shrink tape are applied to the winding at various stages to soak-up excess resin and apply a compacting force to the winding. The periodic application of the bleed cloth and shrink tape can be followed by the placement of the cone rings at a flared end, followed by the application of a force to the outer cone ring, which force is directed substantially axially of the shaft longitudinal axis, causing the outer cone ring to be biased toward the inner cone ring and thereby compact the winding between them.

Figure 1:
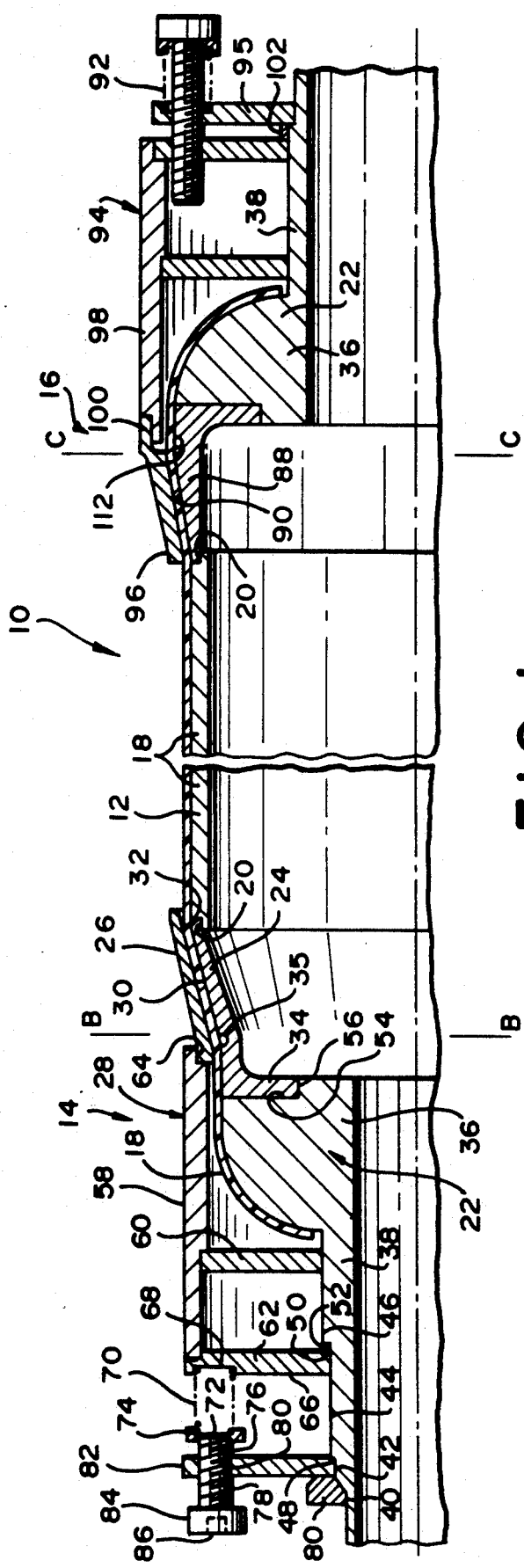
FIG. 1, which is a schematic partial longitudinal cross-sectional view in elevation of the tool apparatus for practicing the method of the present invention according to which a composite shaft is fabricated with at least one end having a flared orientation with surfaces of machine-like quality.

Turning now to FIG. 1, a tool 10 is shown which includes a tubular mandrel 12 and mandrel end fitting assemblies 11 and 16. The tool 10 is mounted in a machine (FIG. 2) for filament winding or tape winding onto the mandrel 12. Any of a number of known machines for this purpose can be used.

A composite shaft 18 is formed by the noted winding process. As such the fiber direction is substantially helical with respect to the longitudinal axis A—A. This fiber orientation is preferred for drive shaft applications. If a uni-directional orientation is desired either very small helical angles are used or a lay-up procedure is used. Such a lay-up procedure is known.

The mandrel 12 is provided at each end with a pilot diameter 20 each defining a similar pilot diameter in the mating part. The outer surface of the mandrel 12 can have a slight taper in its extension between the pilot diameters 20 which facilitates removal of the mandrel after fabrication of the shaft 18.

In the embodiment shown in FIG. 1, the mandrel end fitting assembly 14 includes a turn-around end fitting 22, an inner cone ring 24 (the previously noted mating part) an outer cone ring 26 and a conforming/compacting force generator 28. The inner cone ring 24 has an outwardly flared wall which defines a cone surface 30 and a cylindrical end surface 32. The cylindrical end surface 32 is received in and engages the pilot diameter 20 at one end of the mandrel 12. At its other end the inner cone ring 24 is provided with a pilot seat flange 34. Between its two ends and adjacent to that portion which defines the cone surface 30 the inner cone ring 24 may be provided with a relief groove 35 which is filled-in with, for example, resin prior to winding. The outer ring 26 is designed to be compatible with the inner ring 24 so that it flares outwardly as does the inner cone ring 24.

The turn-around end fitting 22 includes a curved dome 36. The dome 36 is connected with or formed integral with a spindle 38. At its other end the spindle 38 is provided with threads 40. Between the threads 40 and the curved dome 36 the spindle 38 is provided with three centering lands 42, 44, and 46. These lands define two stop surfaces 48 and 50. A shim 52 provides an adjustable stop feature. At the front end of the curved dome 36 a compound groove 54 is formed in which a pilot seat diameter 56 is defined which is engaged by the pilot seat flange 34.

The conforming/compacting force generator 28 includes a force transmitting cylinder 58 and a pair of bulkhead centering rings 60 and 62. The inner bulkhead ring 60 pilots on land 46, while the outer bulkhead ring 62 pilots on land 44 and engages the adjustment shim 52. At its front surface the force transmitting cylinder 58 is provided with a pilot diameter 64 on which one end of the outer reaction ring 26 is received. The outwardly facing outer surface 66 of the outer bulkhead centering ring 62 has at least one but preferably two or more, diameterically opposed, circular recesses 68 formed thereon. These recesses receive one end of a spring 70. The other end of the spring 70 fits within a spring seat 72 of a ring 74. The ring 74 has a bolt receiving seat 76 on its opposed surface within which the front end of the threaded bolt 78 is received. The threaded bolt 78 passes through a threaded hole 80 in an annular bulkhead ring 82. The exposed end of the threaded bolt 78 has a head 84 within which a torque wrench socket 86 is provided.

The mandrel end fitting assembly 16 is slightly modified in comparison with the mandrel end fitting assembly 14 to account for the fact that an outward rather than an inward flared end is desired. An inner cone ring 88 defines a cone surface 90. The surface 90 extends upwardly from the mandrel 12 rather than upwardly to the mandrel 12 as does the surface 30. The spring 92 of the conforming/compacting force generator 94 is located on the outside of the annular bulkhead ring 95 so that the outer cone ring 96 is pulled rather than pushed as is the outer cone ring 26. For this purpose, the outer cone ring 96 and the force transmitting cylinder 98 are threadedly engaged at 100. A limiting shim stop 102 functions to limit travel of the outer cone ring 96.

Figure 2:
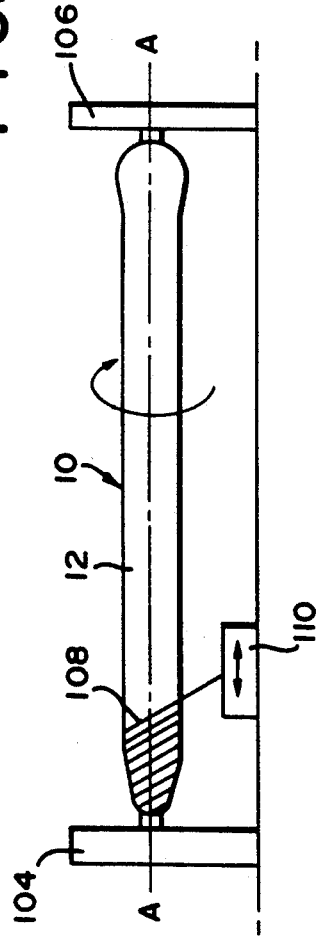
FIG. 2, which is a schematic view illustrating a winding apparatus.

According to the method aspect of the present invention, filaments or tape are dispensed onto the mandrel 12, inner cone rings 24 and 88 and the domes 36. An apparatus for winding the filaments is schematically illustrated in FIG. 2. The tool 10 is shown with the mandrel 12 mounted for rotation between end supports 104 and 106. The mandrel 12 is shown to include an inwardly flared end and an outwardly flared end as in FIG. 1. Filaments or tape 108 are wound on mandrel 12 by a shuttle-type device 110 as the mandrel 12 rotates about its axis A—A, while the conforming/compacting force generators 28 and 94 are deployed after a filament winding sequence.

As noted, the filaments or tape are wound onto the mandrel 12, the inner cone rings 24 and 88 and the domes 36. The domes 36 provide a turn-around which permits the maintance of fiber tension during successive passes of the winding apparatus. The domes 36 also maintain fiber tension during the conforming/compacting step.

As previously noted, according to one preferred feature of the present invention, conforming/compacting with the cone rings occurs after the build-up is completed. Alternatively, conforming/compacting can proceed at intermediate stages during winding. In either case, conforming/compacting is accomplished by adjusting the spring force of the springs 70 and 92, which adjusted force is applied to the outer cone rings 26 and 96 by the force transmitting cylinders 58 and 98, respectively in the direction of the axis A—A. In the case of the cone ring 26, the force is a pushing force, while for the cone ring 96, the force is a pulling force. In either case, the cone rings are urged by the adjusted force toward their respective inner cone rings, and consequently the composite material between the composite material engaging surfaces of the representative pairs of cone rings is conformed/compacted.

The cone rings serve as molds in the process of conforming/compacting. The conforming/compacting has the beneficial effect of producing a concentric machine-like surface at the outer flared end surfaces of the composite build-up, i.e., the conformity and finish of these surfaces is as if they were machined. Also, conforming/compacting aids in producing an optimized resin distribution in the build-up, along with or without the debulking procedure so that neither a resin starved nor resin rich structure will result. It has been found that the intermediate application of conforming/compacting achieves optimization more readily than a single conforming/compacting at the completion of the winding.

The only machining that is necessary is the parting of the composite shaft on the mandrel after curing at planes B—B and C—C. For this purpose the outer cone rings 26 and 96 are removed along with the mandrel end fitting assemblies 14 and 16. To facilitate the cutting of the composite shaft 18 at the planes B—B and C—C, the relief groove 35 and a corresponding relief groove 112 can be provided. These relief grooves are preferably filled with a cured resin material prior to winding. As a result, cutting of the inner cone is prevented and the composite shaft is clearly cut.

The use of pilot diameters (diameters 20, lands 42, 44 and 46, which define stops 48 and 50, and diameter 56) are employed in order to control the concentricity of the composite shaft fabricated. Also, the outer cone rings can be centered as are the inner cone rings for concentricity control. The pilot diameter 64 (FIG. 1) serves to center the outer cone ring 26 as well as to transmit force from the force transmitting cylinder 58 to the outer cone 26.

After the step of conforming/compacting, the tool remains in place with load applied during curing. Curing is accomplished in a known manner. Curing structuralizes the build-up, i.e., it renders it rigid and capable of carrying a load independently. If before or after partial or final curing, it is determined that the flared ends of the outer surfaces require additional material to produce the desired conical configurations, those areas 115 (FIG. 3) can be filled with resin and fibers to achieve the desired configuration. Also, before curing, after partial curing or after total curing of the build-up, the inner and outer flared surfaces may be coated with an elastomeric and fretting resistant coating 150, 152 (FIG. 6) such as a urethane coating to impart a shock resistant/resilient property to the coupler interface such that the coupler loads are transmitted through the elastomer.

Figure 3:
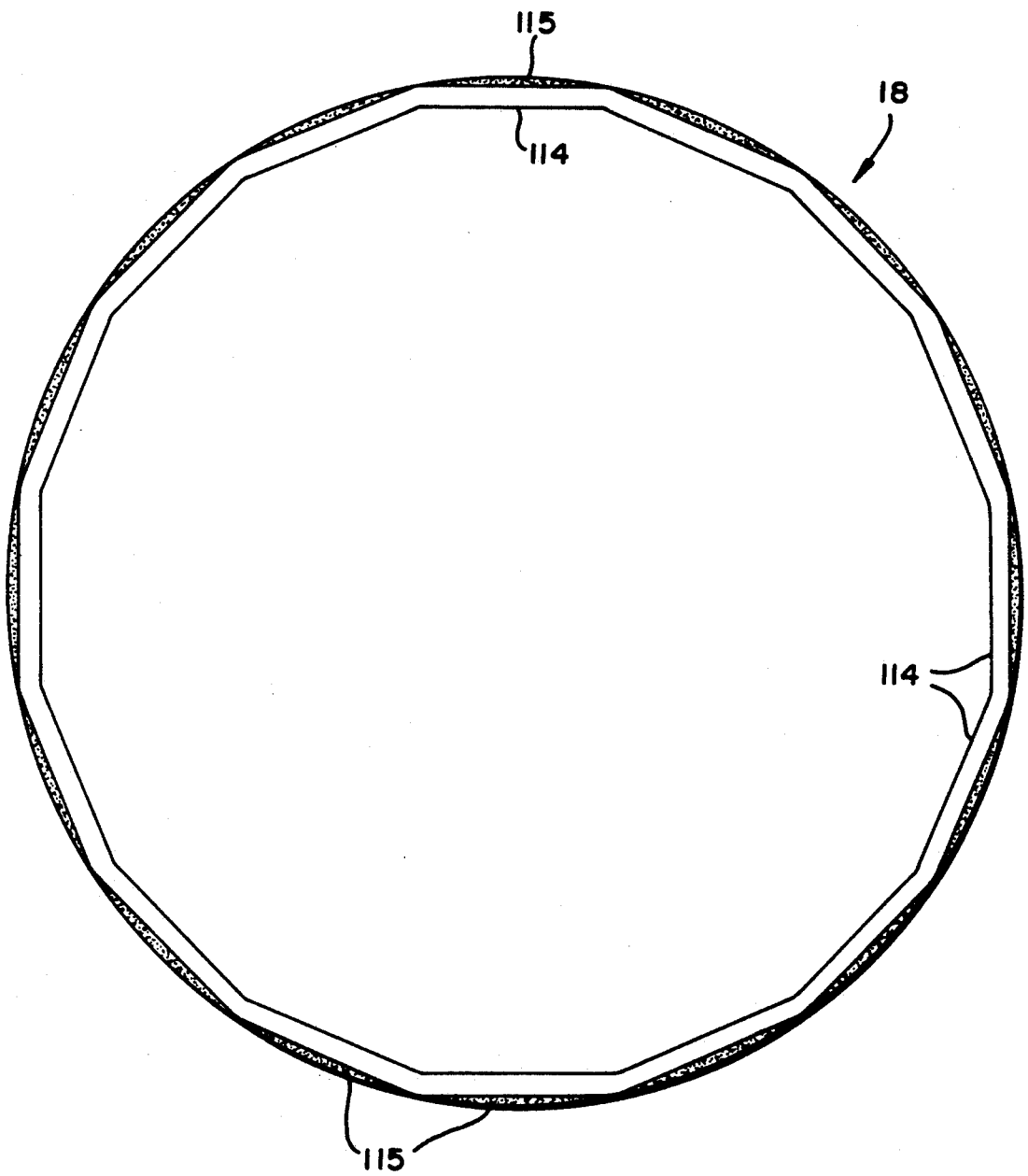
FIG. 3, which is an end view of the composite shaft illustrating the use of the flat surfaces as a keying method for internal cone fittings.

As also shown in FIG. 3, the flared ends of the shaft can be fabricated to include at least one flat surface 114 and preferably a series of these flat surfaces. These flat surfaces are desired when the composite shaft is to be used to transmit torque, although other known keying structures may be used when transmitting torque loads.

To produce these flat surfaces in the flared ends of the shaft, the cone rings are provided with corresponding flat surfaces. In this way it is possible to provide either or both the inner and outer surfaces of the flared ends of the shaft with flat surfaces. The flat surfaces on the inner surface of the flared end of a shaft develop during the winding process, while the flat surfaces on the outer surface of the flared end of a shaft develop during the conforming/compacting process. The conforming/compacting process also has the effect of enhancing the flat surfaces on the inner surface of the flared end of the shaft because the conforming/compacting force is transmitted through the composite material to the inner cone ring.

The cone rings 24, 26, 88, and 96 form part of the tool 10. They can also, however, serve as coupling elements similar to those discussed in the noted copending application.

Figure 5:
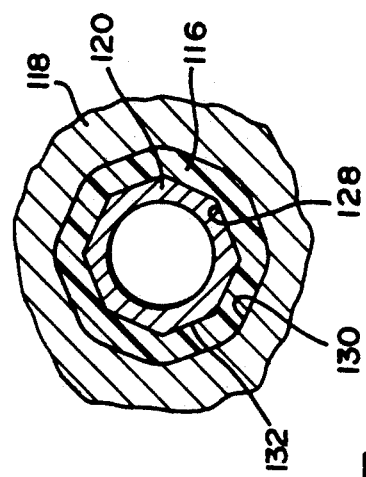
FIG. 5, which is a view taken along 5—5 of FIG. 4.
Figure 4:
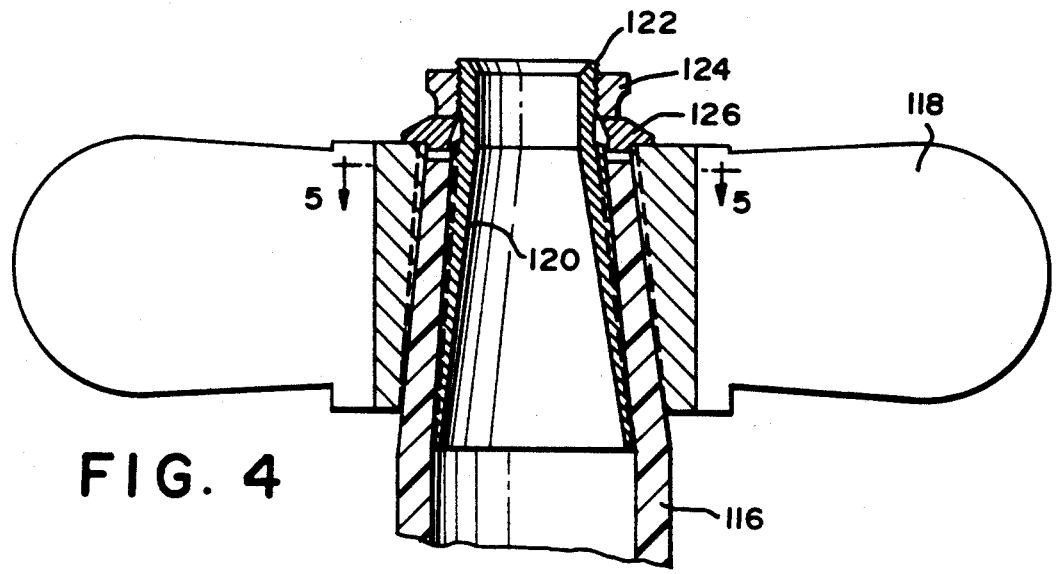
FIG. 4, which is a schematic partial cross-sectional view in elevation of a helicopter rotor shaft fabricated in accordance with the present invention.

Two applications of the invention are shown in FIGS. 4-7. The applications shown in FIGS. 4 and 5 is to a helicopter rotor head. In FIGS. 4 and 5 a composite shaft 116 with an inwardly flared portion is shown to which a rotor hub 118 is connected. The shaft 116 serves as the drive shaft for driving the rotor hub 118. A threaded adapter 120 is mounted within the flared portion of the shaft 116 and extends outwardly therefrom. The outwardly extending portion includes a threaded region 112 which receives a retaining nut 124 on threaded engagement. The retaining nut 124 bears against a retaining plate 126 which secures and preloads the rotor hub 118 to the shaft 116. The shaft 116 is fabricated according to the method noted above to include flat surfaces 128 and 130 on both the inner and outer surfaces, respectively of the inwardly flared portion of the shaft 116, as shown in FIG. 5. Flat surfaces 132 are formed on the outer surface of the threaded adapter 120 which are compatible and engage with the flat surfaces 128. In this particular application of the invention, the flat surfaces 128, 130, and 132 are tapered as shown in FIG. 4, i.e., they are more pronounced at one end. At the end shown in FIG. 5, the flat surfaces are most pronounced, while at the opposite end of the inwardly flared portion a cross section thereof would reveal a circular outer circumference without flat surfaces.

The threaded adapter 120 can be fabricated as is the shaft 120 according to the principles of the present invention.

Figure 6:
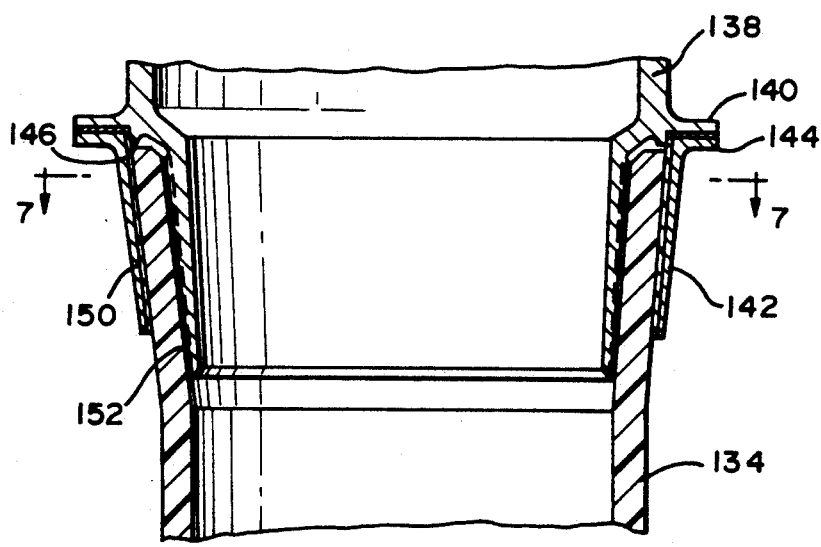
FIG. 6, which is a schematic partial cross-sectional view in elevation of a shaft end coupling in accordance with the present invention.
Figure 7:
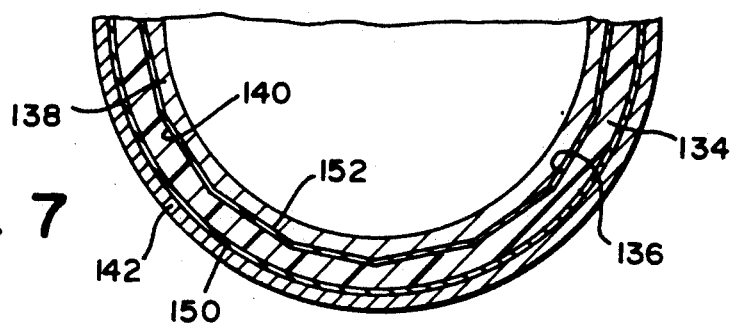
FIG. 7, which is a view taken along line 7—7 of FIG. 6.

In FIGS. 6 and 7 a composite shaft 134 with an outwardly flared portion is shown. The inner surface of the outwardly flared portion defines a circumference with tapered flat surfaces 136, while the outer surface defines a circular circumference. In this application the shaft 134 is intended to be driven only and is not intended to also drive, as in the application shown in FIGS. 4 and 5 where the shaft 116 also drives the rotor hub 118. The shaft 134 is driven by a shaft 138 which includes an inwardly tapered portion, so tapered to be compatible with the outwardly tapered portion of the shaft 134. The shaft 138 includes tapered flat surfaces 140 with are compatible and engage with the flat surfaces 136.

The application shown in FIGS. 6 and 7 has an inner driving member 138 with centering pilot 146 and flange 144. Outer cone ring 142 is secured to inner member 138, by, for example, a bolt pattern, and provides a means of compressing/ preloading drive shaft 134. The compressing/preloading and keying features of the inner member 138 and outer cone ring 142 significantly enhance the load carrying ability of the coupling where such loads can be torsional, axial and bending As such, the bolted flange arrangement provides the same function as does the ring of FIG. 4.

What is claimed is:

1. A method of forming a fully composite shaft defining a longitudinal axis and having a fully composite elongated cylindrical portion and at least one fully composite flared end portion, each defining an inner fully composite surface and an outer fully composite surface, comprising steps of:

dispensing composite material onto a tool to form the fully composite elongated cylindrical portion and the fully composite at least one flared end portion of the composite shaft into their final shape;

applying an adjustable urging force after completion of the dispensing step against a portion of the tool for moving said portion of the tool in the direction of the longitudinal axis and over the inner and outer surface of the fully composite at least one flared end portion, and maintaining said adjustable urging force against said portion of the tool for conforming/compacting the composite material at the fully composite, at least one flared end portion;

subjecting the formed fully composite shaft to curing while maintaining said adjustable urging force against said portion of the tool for conforming/compacting the curing composite material at the fully composite, at least one flared end portion, thereby producing a smooth inner outer surface at the fully composite at least one flared end portion; and removed the tool from the formed and cured fully composite shaft.

2. The method as defined in claim 1, wherein the composite material is dispensed onto the tool so that the fully composite elongated cylindrical portion and the fully composite at least one flared end portion have substantially the same thickness.

3. The method as defined in claim 1, further comprising the step of:

applying an elastomeric coating over the fully composite at least one flared end portion.

4. The method as defined in claim 1, further comprising the steps of:

applying a tension force to the composite material on the fully composite, at least one flared end portion thereby placing the filaments of the composite material in tension, and maintaining the tension force on the filaments while conforming/compacting.

* * * * *